United States Patent
Banerjee et al.

(10) Patent No.: US 10,404,837 B2
(45) Date of Patent: Sep. 3, 2019

(54) USER DATAGRAM PROTOCOL (UDP) APPLICATION HANDLING DURING LIVE KERNEL UPDATE

(71) Applicant: International Business Machines Corporation, Armonk, NY (US)

(72) Inventors: Dwip N. Banerjee, Austin, TX (US); Frederic Barrat, Cugnaux (FR); David ZhiWei Dai, Austin, TX (US); Khalid Filali-Adib, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 14/871,764

(22) Filed: Sep. 30, 2015

(65) Prior Publication Data

US 2017/0094034 A1   Mar. 30, 2017

(51) Int. Cl.
  *H04L 29/06* (2006.01)
  *H04L 29/08* (2006.01)

(52) U.S. Cl.
  CPC ........ *H04L 69/164* (2013.01); *H04L 67/1002* (2013.01); *H04L 67/2842* (2013.01)

(58) Field of Classification Search
  CPC ............... H04L 69/164; H04L 67/1002; H04L 67/2842
  USPC .............................................. 709/223; 718/1
  See application file for complete search history.

(56) References Cited

U.S. PATENT DOCUMENTS

| | | | | |
|---|---|---|---|---|
| 7,627,728 B1 * | 12/2009 | Roeck | ................... | G06F 11/203 711/162 |
| 8,090,836 B1 * | 1/2012 | Bean | ..................... | G06F 9/4856 709/227 |
| 9,229,750 B1 * | 1/2016 | Mehat | ..................... | G06F 9/455 |
| 2003/0115357 A1 * | 6/2003 | Chu | ......................... | H04L 29/06 709/237 |
| 2008/0104588 A1 * | 5/2008 | Barber | ...................... | G06F 8/63 718/1 |
| 2012/0284295 A1 * | 11/2012 | Wang | .................. | G06F 17/3048 707/769 |
| 2013/0111038 A1 * | 5/2013 | Girard | .................. | H04L 45/245 709/226 |
| 2014/0157257 A1 * | 6/2014 | Dow | .................... | G06F 9/45558 718/1 |

* cited by examiner

*Primary Examiner* — David R Lazaro
*Assistant Examiner* — Zi Ye
(74) *Attorney, Agent, or Firm* — Patterson + Sheridan, LLP

(57) ABSTRACT

The present disclosure relates to maintaining network services during kernel update operations. According to one embodiment, a server generates a second computing system executing a second system kernel. The second system kernel is updated in relation to a first system kernel executing on a first computing system. The server pauses network services operating on the first computing system. The server generates a snapshot of the network services operating on the first computing system. While the network services are paused on the first computing system, the server caches data packets received from client devices and destined for network services operating on the first system, migrates the network services to the second computing system, and restores the network service snapshot to the second computing system. Upon completing the migration, the server sends the cached data packets to the one or more network services operating on the second computing system.

20 Claims, 5 Drawing Sheets

USER DATAGRAM PROTOCOL (UDP) APPLICATION HANDLING DURING LIVE KERNEL UPDATE

BACKGROUND

The present invention relates to service continuity in computing systems, and more specifically to providing service continuity for certain applications during live kernel updates.

Server workloads may include critical functions that should have high availability rates. Some workloads may be delay tolerant and inherently reliable. For example, workloads that communicate with client devices using transmission control protocol (TCP) are generally inherently reliable, since the protocol requires that a receiving client acknowledge receipt of packets, and transmitters resend packets to the client when acknowledgment messages indicate that a packet was not received. However, some workloads, such as serving multimedia content (e.g., audio and/or video content) on demand or substantially in real time, are not delay tolerant and may be transmitted using protocols that generally do not provide for reliable content delivery (e.g., via the user datagram protocol (UDP), which does not use acknowledgment or retransmission of lost packets).

Generally, operating systems are updated as update packages are released by an operating system provider to address issues reported by customers. While some updates may not affect operating system kernel components, updates to critical parts of an operating system, such as kernel components, kernel extensions, and some libraries, may require that the operating system be restarted in order to apply the update. To reduce downtime caused by rebooting a server to apply operating system kernel updates, live kernel update features can update critical parts of an operating system without requiring the server be rebooted.

Typically, during a live kernel update, an update manager downloads an update package, applies the update package to the operating system, and creates a clone of the operating system. Subsequently, the update manager transitions the server workload (e.g., services that were running and serving one or more client devices) to the cloned operating system, and after the transition, terminates operations by the pre-update operating system.

SUMMARY

One embodiment disclosed herein includes a method for maintaining network services during kernel update operations. The method generally includes generating a second computing system executing a second system kernel. The second system kernel is updated in relation to a first system kernel executing on a first computing system. The server pauses network services operating on the first computing system. The server generates a snapshot of the network services operating on the first computing system. While network services are paused on the first computing system, the server caches data packets received from one or more client devices and destined for network services operating on the first system, migrates the network services to the second computing system, and restores the snapshot of the network services to the second computing system. Upon completing the migration, the server sends the cached data packets to the one or more network services operating on the second computing system.

Another embodiment includes a computer-readable storage medium having instructions, which, when executed on a processor, performs an operation for maintaining network services during kernel update operations. The method generally includes generating a second computing system executing a second system kernel. The second system kernel is updated in relation to a first system kernel executing on a first computing system. The server pauses network services operating on the first computing system. The server generates a snapshot of the network services operating on the first computing system. While network services are paused on the first computing system, the server caches data packets received from one or more client devices and destined for network services operating on the first system, migrates the network services to the second computing system, and restores the snapshot of the network services to the second computing system. Upon completing the migration, the server sends the cached data packets to the one or more network services operating on the second computing system.

Still another embodiment includes a processor and a memory storing a program, which, when executed on the processor, performs an operation for maintaining network services during kernel update operations. The method generally includes generating a second computing system executing a second system kernel. The second system kernel is updated in relation to a first system kernel executing on a first computing system. The server pauses network services operating on a first computing system executing a first system kernel. The server generates a snapshot of the network services operating on the first computing system. While network services are paused on the first computing system, the server caches data packets received from one or more client devices and destined for network services operating on the first system, migrates the network services to the second computing system, and restores the snapshot of the network services to the second computing system. Upon completing the migration, the server sends the cached data packets to the one or more network services operating on the second computing system.

DETAILED DESCRIPTION

Embodiments presented herein describe techniques for providing data services to client systems (e.g., providing requested data from a server to one or more clients) during a kernel update operations by caching received packets at the network stack. After kernel update operations are completed and the data services are migrated from the pre-update kernel to the post-update kernel, the server processes the cached packets to provide services to client systems as requested in the cached packets. Subsequently, when the cache is cleared, the data services, which have been migrated from the pre-update kernel to the post-update kernel, resume processing received packets as they are received. By caching received packets while data services migrate from a pre-update kernel to a post-update kernel, the server can provide substantially uninterrupted service to client devices that receive data from the server via an unreliable protocol (i.e., a protocol that does not guarantee successful delivery of packets).

In one embodiment, a server includes a pre-update kernel, a network stack, and a kernel update service. The kernel update service obtains a kernel update package from a remote source or a storage device attached to the server. To update the kernel without rebooting the server, the kernel update service spawns a copy of the pre-update kernel and applies the update to the copied kernel to generate a post-update kernel. The kernel update service transitions operations from the pre-update kernel to the post-update kernel, during which time the network stack caches received packets for future processing. Once the operations are transitioned to the post-update kernel, the operations can process the cached received packets, and after clearing the cache, the operations process packets received from client devices as they arrive at the server.

Advantageously, caching received data packets during live kernel update operations in which operations on a server transition from a pre-update kernel to a post-update kernel allows for some reliability to be introduced for applications that communicate with client devices and/or using unreliable protocols (e.g., UDP). By caching such packets, a server can avoid losing data requests received from client devices and/or applications during live kernel update and migration operations. Instead of losing these requests, the server can provide the data requested by a client during kernel update and migration operations, which may avoid unpredictable behavior at the client device and/or application from receiving data other than the requested data.

Figure 1:
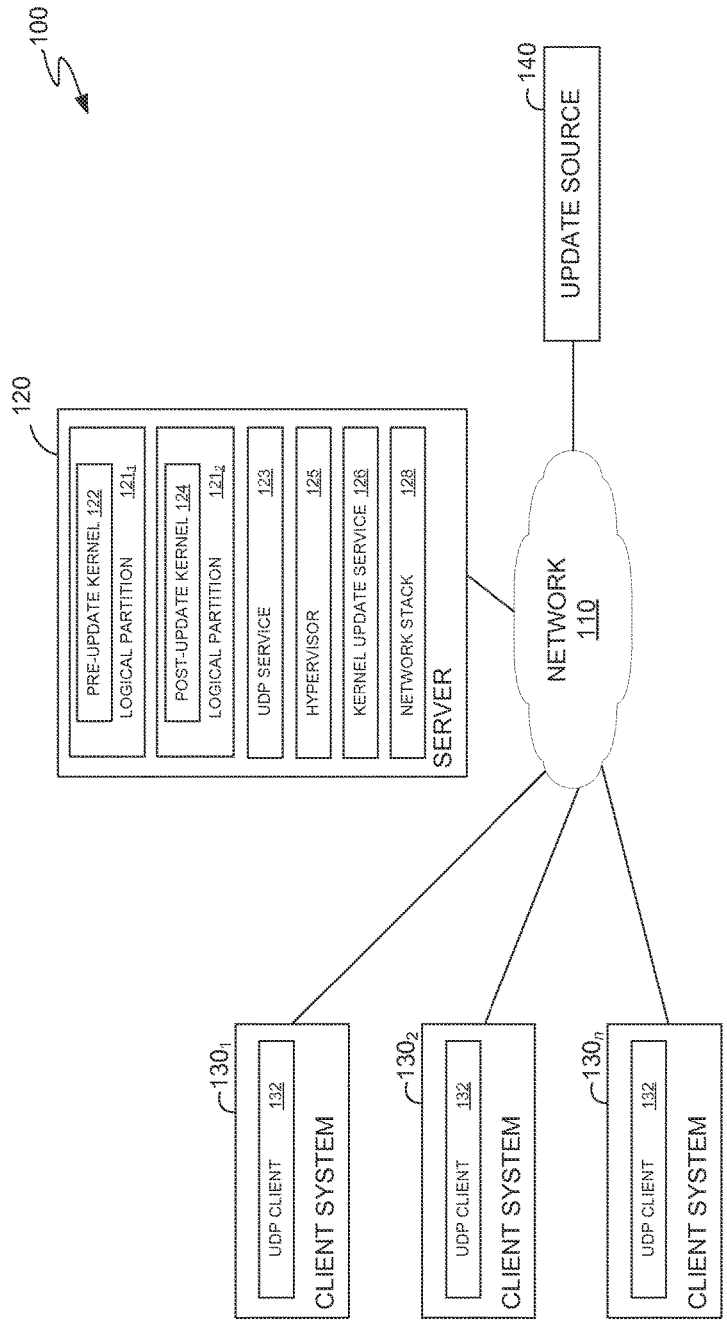
FIG. 1 illustrates an example of a networked computing environment, according to one embodiment.

FIG. 1 illustrates an example computing environment, according to one embodiment. As shown, the computing environment includes a server 120, a plurality of client systems 130, and an update source 140, connected to a network 110.

Server 120 generally includes a plurality of logical partitions 121, a pre-update kernel 122, a post-update kernel 124, a hypervisor 125, a kernel update service 126, and a network stack 128. The pre-update kernel 122 and post-update kernel 124 may host a variety of services, including a UDP service 123 and data services using TCP or other reliable transmission mechanisms (i.e., transmission protocols that are designed to ensure that data is successfully received at a destination). UDP service 123, for example, may be a multimedia service for streaming audio and/or video content, server management protocols, or other services that prioritize response speed over reliable transmission.

In some cases, services (UDP service 123 and/or other data services) may be deployed in workload partitions. A workload partition generally provides a container in which a service may execute. When a user or process migrates a workload partition (e.g., between different physical or virtual machines), the user or process can save the current state of the service (e.g., as an image) and restore the service on another physical or virtual machine. Because the current state of the service is restored on the destination physical or virtual machine, using workload partitions to deploy services generally allows for service migration between physical and/or virtual machines without rebooting the service and requiring client devices 130 to reconnect with the service after the service is rebooted.

When server 120 is booted up, hypervisor 125 may be loaded into memory. Hypervisor 125 is an application generally configured to actively manage the distribution and utilization of virtualized hardware to one or more logical partitions 121. Hypervisor 125 generally abstracts hardware resources, such as the processor and memory at server 120, from the logical partitions 121. In some cases, hypervisor 125 may be configured to share CPU and memory resources among the logical partitions 121 while providing a dedicated network interface and/or other input/output devices to each logical partition 121. In other cases, hypervisor 125 may provide a fully virtualized system (i.e., processor, memory, and input/output devices) on which each logical partition 121 operates.

When server 120 is booted up, a logical partition $121_1$ loaded with pre-update kernel 122 may be the only kernel present on the server. While services (e.g., UDP service 123) run on pre-update kernel 122, kernel update service 126 regularly queries an update source 140 to determine whether or not updates are available for the server. If kernel update service 126 determines that a kernel update package is available for server 120, kernel update service 126 downloads the kernel update package from update source 140.

In one case, to perform a live kernel update on server 120, kernel update service 126 may spawn a logical partition $121_2$ with a post-update kernel 124 based on pre-update kernel 122. Initially, post-update kernel 124 may be a copy of the pre-update kernel 122. After kernel update service 126 spawns logical partition $121_2$ and post-update kernel 124, kernel update service 126 may apply the downloaded kernel update package to post-update kernel 124.

In another case, to perform a live kernel update on server 120, kernel update service applies the downloaded kernel update package to pre-update kernel 122 stored on logical partition $121_1$. Kernel update service 126 may spawn a logical partition $121_2$ with post-update kernel 124, which may be a copy of pre-update kernel 122 with the downloaded update package applied.

In some cases, pre-update kernel 122 and post-update kernel 124 may be hosted on different virtual machines residing on the same server 120. Spawning post-update kernel 124 may include creating a new virtual machine based on a configuration of the virtual machine hosting pre-update kernel 122. In other cases, pre-update kernel and post-update kernel may be hosted on different logical partitions 121 by creating a clone of the original root partition hosting the pre-update kernel.

Upon updating the kernel to post-update kernel 124, kernel update service 126 migrates services from pre-update kernel 122 to post-update kernel 124. To migrate a service, kernel update service 126 may pause the service at pre-update kernel 122 and take a snapshot of the present workload on the pre-update kernel 122. Kernel update service 126 moves the snapshot from pre-update kernel 122 to post-update kernel 124 and restores the workload onto post-update kernel 126. After migration, kernel update service 126 restarts the services that were migrated to post-update kernel 124 and continue to provide services to the one or more client devices and/or applications that were previously served by services running on pre-update kernel 122.

If a user wishes to revert to pre-update kernel 122, the user can remove the partition or virtual machine on which post-update kernel 124 is installed and set pre-update kernel 122 to boot when the server is powered on. To save space, however, kernel update service 126 may remove the partition or virtual machine hosting the pre-update kernel 122 after migration and resumption of services on post-update kernel 124.

Network stack 128 provides an interface for pre-update kernel 122 and post-update kernel 124 to receive data requests from client devices 130 and transmit requested data to the client devices 130. Network stack 128 may provide one or more queues in which received packets may be stored at network stack 128 before network stack 128 passes the received packets to a service (e.g., UDP service 123) for processing.

Before kernel update service 126 takes a snapshot of the services (e.g., UDP service 123 and/or other services running on server 120) operating on pre-update kernel 122, kernel update service 126 blocks network traffic to and from pre-update kernel 122. In some cases, kernel update service 126 may load a filter to block network traffic to and from the server 120. For each service, kernel update service 126 saves the socket state and process control block state, along with any queued packet buffers. Kernel update service 126 may also save queued connections for sockets in a LISTEN state, which may include sockets whose connections have not yet been accepted. If the server 120 hosts any domain sockets, the file descriptors embedded in transmitted messages may also be saved.

To provide for generally uninterrupted data service to the client devices 130 while kernel update service applies an update to server 120, kernel update service 126 may activate a packet storage cache at network stack 128. The cache may be structured, for example, as a queue, where packets received earlier are read and processed before packets received later. In some cases, a cache may be configured for each data service running on server 120 or for each network socket configured on server 120 to transmit data to client devices 130. Between pausing of services at pre-update kernel 122 and resumption of services at post-update kernel 124, network stack 128 may store received packets received from the client devices 130 in the cache.

When kernel update service 126 restarts services (e.g., UDP service 123) on post-update kernel 124, the services may process packets cached at network stack 128 before the services process packets received in real time. To allow services to process packets cached at network stack 128 during service migration from pre-update kernel 122 to post-update kernel 124, kernel update service 126 restarts the network connections from network connection information saved before services are migrated. To restart the network connections, kernel update service 126 restores the saved socket state, protocol control block state, and queued buffers. For sockets in the LISTEN state, kernel update service 126 restores the queued connections to allow for client devices 130 to accept pending connections. For domain sockets, kernel update service 126 restores the file descriptors embedded in transmitted messages. Finally, kernel update service 126 may send Internet Group Management Protocol messages for any sockets bound to multicast addresses.

After kernel update service 126 restores network connectivity, kernel update service 126 transfers the cached packets to the network connections associated with their respective services. By transferring the packets from a cache in network stack 128 to the associated service, services may generally have immediate access to data that was accumulated during the kernel update operations. When the caches are flushed (e.g., a service has processed all packets stored in a cache associated with the service), a service generally resumes processing packets received in real time.

Client systems 130 may include a plurality of client applications that may communicate with services running on server 120. As discussed above, a UDP client 132 may include, for example, streaming multimedia applications (e.g., streaming video, live television, etc.), instant messaging applications, or other applications that prioritize processing speed over reliable packet transmission and reception. When a user starts executing UDP client 132, the UDP client 132 may transmit a request for data to the associated UDP service 123 on server 120 and begin receiving the requested data from server 120.

While live kernel updates are performed on server 120, UDP client 132 may continue to transmit data packets to UDP service 123 (e.g., requests for data from server 120). As discussed above, packets transmitted from UDP client 132 to UDP service 123 may be cached at the network stack at sever 120 for future deliver to UDP service 123. At a later point in time, when server 120 completes kernel update procedures and service migration from a pre-update kernel 122 to post-update kernel 124, UDP service 123 may begin to process packets received during the kernel update. As UDP service 123 processes these packets, UDP client 132 may receive data in response to the transmitted data packets from server 120. Because transmitted data packets are cached at server 120 during kernel update processes (rather than discarded), UDP client may be provided with uninterrupted service from server 120, which may avoid application errors from not receiving the requested data.

Update source 140 may be, for example, a central update authority. Update source 140 may provide a repository storing update packages and information about the most recent update package available for a given operating system (e.g., determined by version number, release date, etc.). Update source 140 generally receives, from kernel update service 126 at server 120, information about a current version of various software components operating on server 120. In response, update source 140 transmits a message indicating whether updates are available for one or more software components operating on server 120. The message may include, for example, information identifying the software components that may be updated, as well as information about the version of the software component corresponding to the update package. In response to a request for a software update package, update source 140 transmits the requested software update package to server 120.

Figure 2:
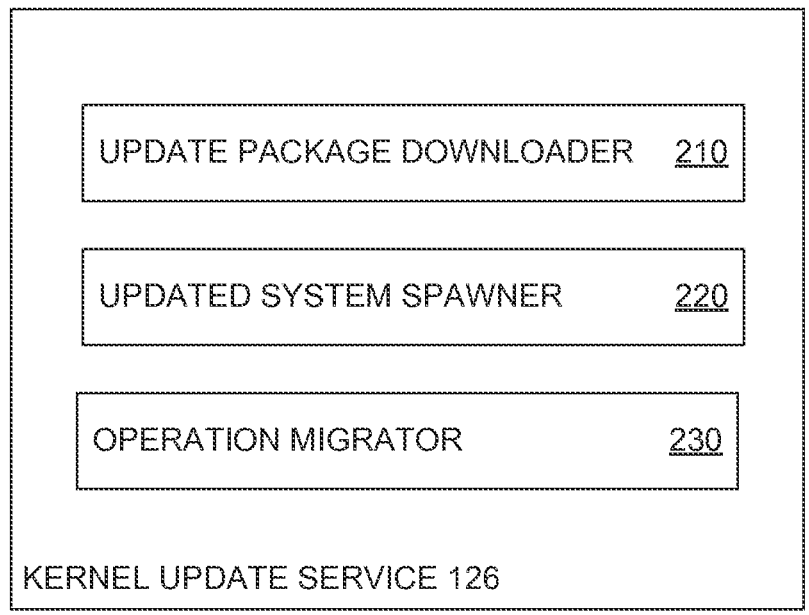
FIG. 2 is a block diagram illustrating an example kernel update service, according to one embodiment.

FIG. 2 illustrates an example kernel update service 126, according to certain aspects of the present disclosure. As illustrated, kernel update service 126 includes an update package downloader 210, updated system spawner 220, and operation migrator 230.

Update package downloader 210 generally provides an interface between server 120 and update source 140. Update package downloader 210 may initially query update source 140 to determine whether or not update packages are available for server 120. If update packages are available for server 120, update package downloader 210 downloads the update packages from update source 140 and begins kernel update procedures, as described above.

As part of the kernel update procedure, updated system spawner 220 pauses network operations at server 120, saves the state of network operations at server 120, and creates a copy of the pre-update kernel 122. As described above, in some cases, updated system spawner 220 may create a post-update kernel 124 on new logical partition on server 120 or a new virtual machine hosted on server 120. Initially, post-update kernel 124 is a copy of the pre-update kernel 122. After updated system spawner 220 creates a copy of the pre-update kernel 122, updated system spawner 220 applies the downloaded update packages to post-update kernel 124.

Upon spawning a logical partition or new virtual machine on server 120 containing post-update kernel 124, control may pass from updated system spawner 220 to operation migrator 230. Operation migrator 230 migrates services previously operating on pre-update kernel 122 to post-update kernel 124. As discussed above, in some cases, operation migrator 230 takes a snapshot of the network activity and services operating on server 120 before the update packages are downloaded and applied to server 120. After updated system spawner 220 applies the update packages to post-update kernel 124, operation migrator replicates the services that were previously running on pre-update kernel 122 at a partition or virtual machine hosting post-update kernel 124. Operation migrator 230 additionally restarts network connections on post-update kernel 124 based on a saved state of the network connections before updated system spawner 220 paused operations at server 120 and started live kernel update operations. As part of restarting network connections on post-update kernel 124, operation migrator 230 may transfer packets cached at network stack 128 to services operating on post-update kernel 124. By caching packets during kernel update operations and transferring the cached packets to services operating on post-update kernel 124, kernel update procedures may not disrupt data services provided to applications running on client systems 130 (e.g., UDP client 132).

Figure 3:
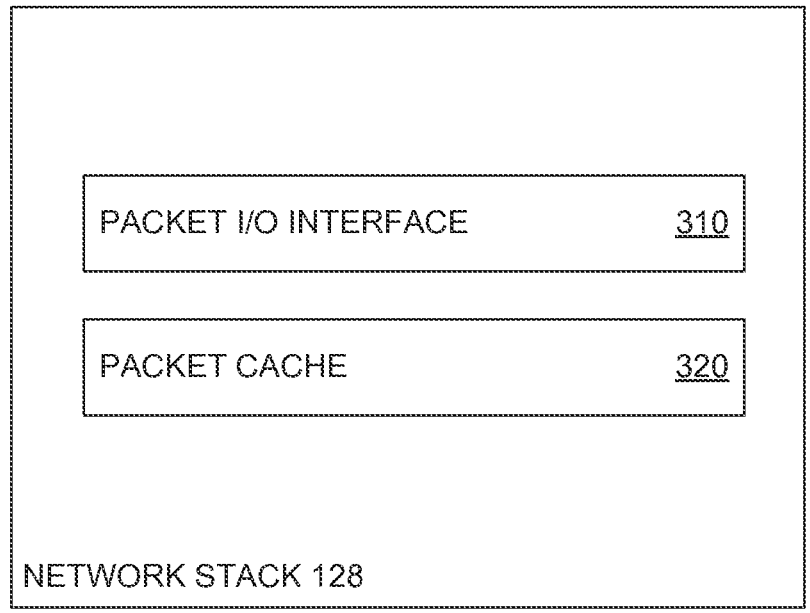
FIG. 3 is a block diagram illustrating an example network stack, according to one embodiment.

FIG. 3 illustrates an example network stack 128, according to certain aspects of the present disclosure. As illustrated, network stack 128 generally includes a packet I/O interface 310 and packet cache 320.

Packet I/O interface 310 generally allows a server 120 to receive data packets transmitted by client devices 130 and transmit data packets to client devices 130. During normal operations (i.e., when kernel update engine is inactive, or is not applying update packages to server 120), packet I/O interface 310 transfers received data packets to the appropriate service operating on server 120. Each service may bind input/output operations to one or more ports on a network interface, and packet I/O interface 310 generally reads received packets to determine which port (and consequently, which service) the packet should be routed to for processing. Correspondingly, services operating on server 120 generally transmits data in response to received packets through one or more output ports to client devices 130 via packet I/O interface 310.

While kernel update engine 126 performs kernel update operations on server 120, data transmission operations may be paused at packet I/O interface 310. Meanwhile, packet I/O interface 310 may redirect received data transmissions to packet cache 320. As network stack 128 receives data packets from client devices 130 via packet I/O interface 310, network stack may save received packets (in the order received) to a portion of the packet cache 320 associated with a particular service. For example, a first packet cache 320 may be dedicated to packet communications associated with UDP service 123, while other packet caches may be dedicated to other services operating on server 120. When kernel update engine 126 completes kernel update operations and restarts services operating on server 120 (specifically, on the portion of server 120 hosting post-update kernel 124), packet cache 320 may transfer cached packets from packet cache 320 to the appropriate service for additional processing and transmission of response data packets based on the received packet.

Figure 4:
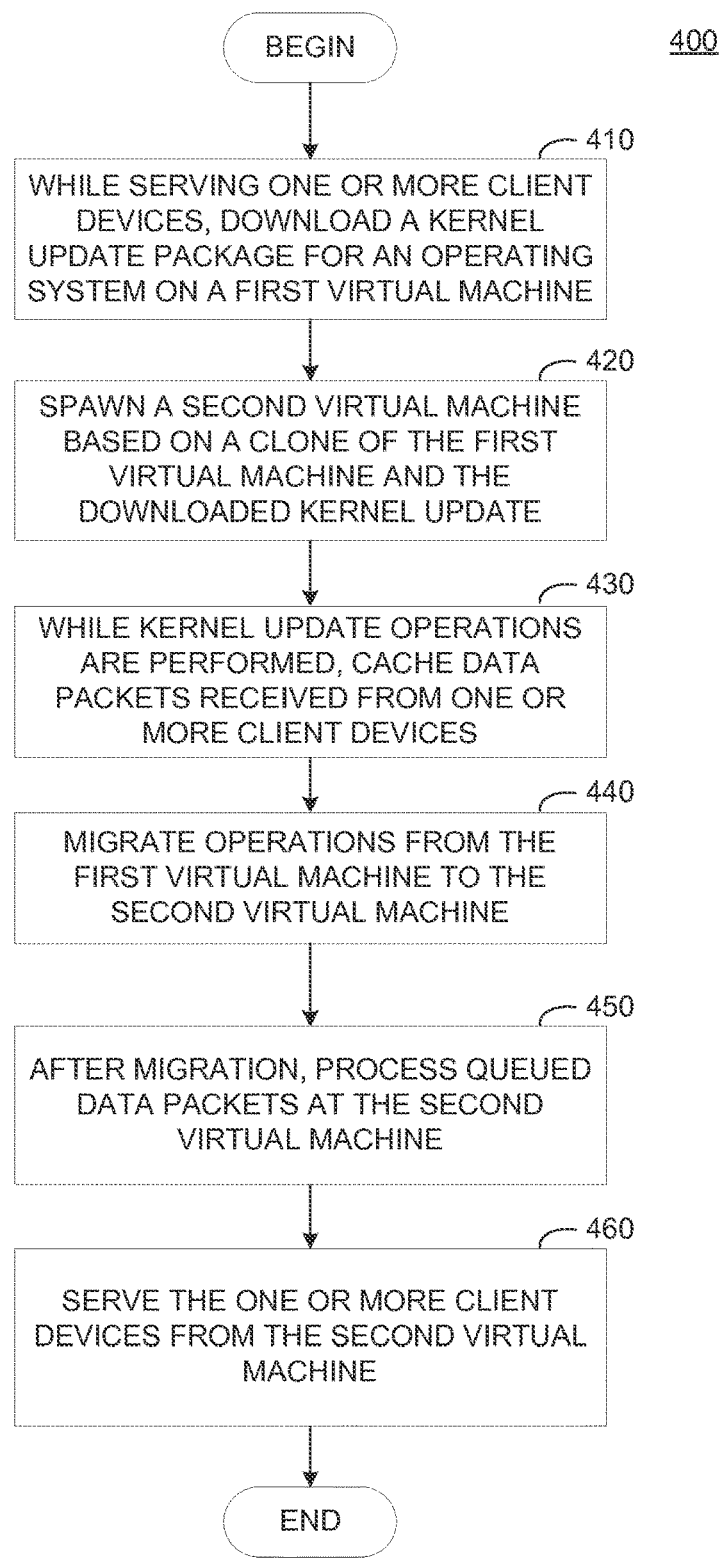
FIG. 4 illustrates a method for maintaining data services for client systems during kernel update operations, according to one embodiment.

FIG. 4 illustrates an example method 400 for handling unreliable transmission services (e.g., services using UDP transmission) during kernel update operations, according to some embodiments. Method 400 begins at step 410, where, while serving one or more client devices, a server downloads a kernel update package for an operating system running on a first virtual machine on server 120. As discussed above, an operating system may download kernel update packages when a kernel update service component at a server determines that updates are available for the version of the operating system kernel running on a server 120 (e.g., based on a comparison of the current kernel version operating on server 120 and the a version of the most recent update package stored in update repository 140.

At step 420, the server spawns a second virtual machine based on a clone of the first virtual machine and the downloaded kernel update. The second virtual machine initially may be a direct copy of the first virtual machine. As discussed above, the server may apply a downloaded update package to the first virtual machine before spawning the second virtual machine. When the second virtual machine is created, the second virtual machine runs an operating system patched with the downloaded kernel update. Before the server spawns the second virtual machine, the server may pause network operations at the first virtual machine and take a snapshot of the current state of the data services running on the first virtual machine.

At step 430, while kernel update operations are being performed, the server caches data packets received from one or more client devices. As discussed above, the cache may be implemented at the network stack, and individual caches may be used to cache received packets on a per-service basis. At step 440, the server migrates operations from the first virtual machine to the second virtual machine. When a server spawns the second virtual machine from the first virtual machine and installs the downloaded kernel update packages, the server may restore the services on the second virtual machine using the information in the snapshot taken from the first virtual machine. For example, if the data services are stored as workload partitions on server 120, the workload partitions may be unmounted from the first virtual machine and mounted on the second virtual machine.

At step 450, after migration of operations from the first virtual machine to the second virtual machine, the server processes cached data packets at the second virtual machine. As discussed above, when the server resumes operations at the second virtual machine, cached packets may be transferred from a cache at network stack 128 to a buffer associated with a particular service (e.g., UDP service 123). At step 460, the server serves the one or more client devices from the second virtual machine (e.g., the virtual machine hosting the post-update kernel).

Figure 5:
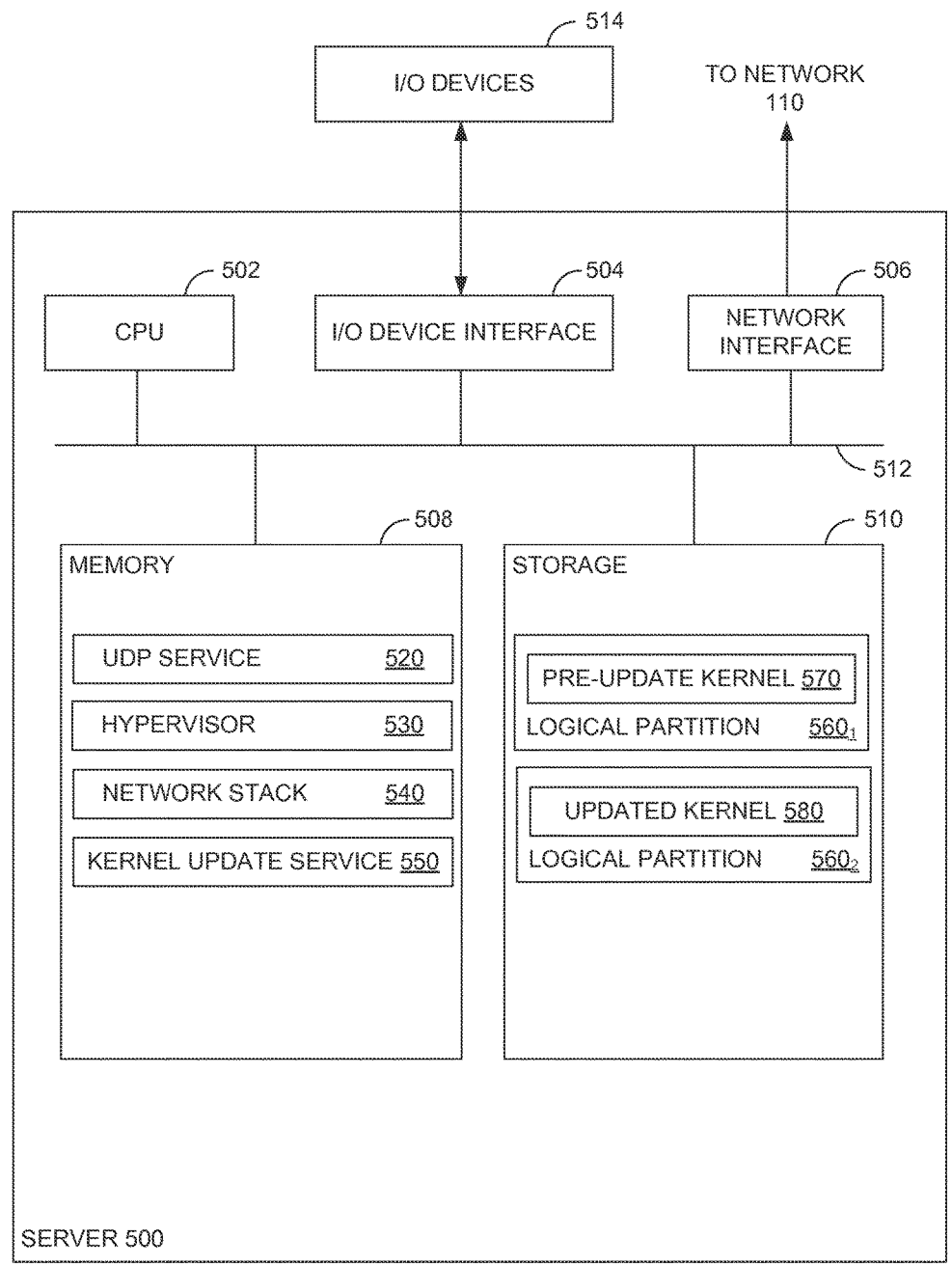
FIG. 5 illustrates an example computing system for data services for client systems during kernel update operations, according to one embodiment.

FIG. 5 illustrates an example server 500 that caches received data packets during live kernel update operations, according to an embodiment. As shown, the server includes, without limitation, a central processing unit 502, one or more I/O device interfaces 504, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a UDP service 520, hypervisor 530, network stack 540, and kernel update service 550. As discussed above, UDP service 520 communicates with a client device and/or application using the User Datagram Protocol, which is connectionless and does not provide for guaranteed or reliable transmission of packets to a receiving device. In some cases, UDP service 520 may receive requests for data from a client device (e.g., a multimedia file) and provide the requested file to the client device.

Hypervisor 530, as discussed above, generally manages the distribution and utilization of virtualized hardware resources (e.g., virtualized processors, I/O device interfaces, network interfaces, and memory) to one or more logical partitions located in storage 510. When server 500 spawns a new logical partition (e.g., logical partition $560_2$) from the logical partition on which a pre-update kernel is installed, hypervisor 530 generally allocates virtualized resources (e.g., processing time, memory, etc.) to the new logical partition. When logical partitions are shut down and/or deleted, hypervisor 530 may reallocate the virtualized resources previously used by the shut down or deleted logical partition to other logical partitions on the server 500.

Network stack 540, as discussed above, generally provides an interface for UDP service 520 (and other data services operating on server 500) to transmit and receive data packets. While server 500 performs kernel update operations, network stack 540 may suspend redirection of data packets to the intended destinations and instead cache received data packets in a data structure associated with a particular port or service. When kernel update operations are finished (i.e., operations have been migrated from logical partition $560_1$ hosting pre-update kernel 570 to logical partition $560_2$ hosting updated kernel 580), network stack 540 may resume redirection of data packets to the intended destinations and provide the cached data packets to the appropriate services for processing.

Kernel update service 550 queries an external update source to determine whether or not update packages are available for pre-update kernel 570. If update packages are available, kernel update service 550 downloads the update package and spawns a copy of the pre-update kernel (e.g., on a new logical partition $560_2$ in storage or a new virtual machine with the same configuration as the virtual machine hosting the pre-update kernel). Kernel update service generates updated kernel 580 by installing the downloaded update package to the spawned copy of pre-update kernel 570 on new logical partition $560_2$. During kernel update operations, kernel update service 550 can pause network services at pre-update kernel 570, take a snapshot of the network services at pre-update kernel 570, and restore the snapshot to updated kernel 580.

As shown, storage 510 includes a plurality of logical partitions 560, a pre-update kernel 570, and an updated kernel 580. Pre-update kernel 570 and updated kernel 580 may be stored as different partitions on a storage device (e.g., pre-update kernel may be stored on logical partition $560_1$, and updated kernel 580 may be stored on logical partition $560_2$) or as different virtual machines. When server 500 completes kernel update operations, the logical partition $560_1$ or virtual machine hosting pre-update kernel 570 may be removed, and the logical partition $560_2$ or virtual machine hosting updated kernel 580 designated to start up when server 500 boots up.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for maintaining network services during kernel update operations, comprising:
    generating a second computing system executing a second system kernel, wherein the second system kernel is updated in relation to a first system kernel executing on a first computing system;
    pausing network services operating on the first computing system;
    generating a snapshot of the network services operating on the first computing system;
    while the network services are paused on the first computing system:
        saving a plurality of queued connections for a first socket on the first computing system, wherein the first socket is in a LISTEN state,
        receiving data packets from one or more client devices and destined for network services operating on the first computing system,
        reading each respective data packet of the received data packets to determine a target network service of the respective data packet,
        caching a first socket state, a first protocol control block state, and a first plurality of data packets destined for a first network service in a first data cache on the first computing system,
        caching a second socket state, a second protocol control block state, and a second plurality of data packets destined for a second network service in a second data cache on the first computing system,
        migrating the network services to the second computing system, wherein migrating the network services comprises restoring the plurality of queued connections for the first socket to a second socket on the second computing system, and
        restoring the snapshot of the network services to the second computing system; and
    upon restoring the snapshot of the network services to the second computing system, restarting the network services on the second computing system, wherein restarting the network services comprises:
        sending the cached first socket state, first protocol control block state, and first plurality of data packets to the first network service operating on the second computing system and sending the cached second socket state, second protocol control block state, and second plurality of data packets to the second network service operating on the second computing system; and
        upon sending the cached first socket state, first protocol control block state, and first plurality of data packets to the first network service and the cached second socket state, second protocol control block state, and second plurality of data packets to the second network service, sending received packets to the network services as they are received.

2. The method of claim 1, wherein generating a second computing system comprises creating, from a first logical partition storing the first system kernel, a second logical partition based on data stored on the first logical partition.

3. The method of claim 2, further comprising:
upon completing the migration, deleting the first logical partition.

4. The method of claim 1, wherein generating a second computing system comprises creating, from a first virtual machine executing the first system kernel, a second virtual machine with identical data as the first virtual machine.

5. The method of claim 4, further comprising:
deleting the first virtual machine.

6. The method of claim 1, wherein the network services comprise one or more services that communicate with the client devices using User Datagram Protocol (UDP).

7. The method of claim 1, wherein the caching comprises storing received data packets in a plurality of data structures, and wherein the data packets are stored in one of the plurality of data structures based on a network service for which the received data packet was addressed.

8. The method of claim 1, wherein the caching comprises storing received data packets in a cache local to a network interface on the first computing system.

9. A computer program product, comprising:
a non-transitory computer-readable storage medium having computer readable program code embodied therewith, the computer readable program code configured to perform an operation for maintaining network services during kernel update operations, the operation comprising:
generating a second computing system executing a second system kernel, wherein the second system kernel is updated in relation to a first system kernel executing on a first computing system;
pausing network services operating on the first computing system;
generating a snapshot of the network services operating on the first computing system;
while the network services are paused on the first computing system:
saving a plurality of queued connections for a first socket on the first computing system, wherein the first socket is in a LISTEN state,
receiving data packets from one or more client devices and destined for network services operating on the first computing system,
reading each respective data packet of the received data packets to determine a target network service of the respective data packet,
caching a first socket state, a first protocol control block state, and a first plurality of data packets destined for a first network service in a first data cache on the first computing system,
caching a second socket state, a second protocol control block state, and a second plurality of data packets destined for a second network service in a second data cache on the first computing system,
migrating the network services to the second computing system, wherein migrating the network services comprises restoring the plurality of queued connections for the first socket to a second socket on the second computing system, and
restoring the snapshot of the network services to the second computing system; and
upon restoring the snapshot of the network services to the second computing system, restarting the network services on the second computing system, wherein restarting the network services comprises:
sending the cached first socket state, first protocol control block state, and first plurality of data packets to the first network service operating on the second computing system and sending the cached second socket state, second protocol control block state, and second plurality of data packets to the second network service operating on the second computing system; and
upon sending the cached first socket state, first protocol control block state, and first plurality of data packets to the first network service and the cached second socket state, second protocol control block state, and second plurality of data packets to the second network service, sending received packets to the network services as they are received.

10. The computer program product of claim 9, wherein generating a second computing system comprises creating, from a first logical partition storing the first system kernel, a second logical partition based on data stored on the first logical partition.

11. The computer program product of claim 9, wherein generating a second computing system comprises creating, from a first virtual machine executing the first system kernel, a second virtual machine with identical data as the first virtual machine.

12. The computer program product of claim 9, wherein the network services comprise one or more services that communicate with the client devices using User Datagram Protocol (UDP).

13. The computer program product of claim 9, wherein the caching comprises storing received data packets in a plurality of data structures, and wherein the data packets are stored in one of the plurality of data structures based on a network service for which the received data packet was destined.

14. The computer program product of claim 9, wherein the caching comprises storing received data packets in a cache local to a network interface on the first computing system.

15. A system, comprising:
a processor; and
a memory storing one or more instructions which, when executed by the processor, performs an operation for maintaining network services during kernel update operations, the operation comprising:
generating a second computing system executing a second system kernel, wherein the second system kernel is updated in relation to a first system kernel executing on a first computing system;
pausing network services operating on the first computing system;
generating a snapshot of the network services operating on the first computing system;
while the network services are paused on the first computing system:
saving a plurality of queued connections for a first socket on the first computing system, wherein the first socket is in a LISTEN state,
receiving data packets from one or more client devices and destined for network services operating on the first computing system,
reading each respective data packet of the received data packets to determine a target network service of the respective data packet, caching a first socket state, a first protocol control block state, and a first plurality of data packets destined for a first network service in a first data cache on the first computing system, caching a second socket state, a second protocol control block state, and a second plurality of data packets destined for a second network service in a second data cache on the first computing system, migrating the network services to the second computing system, wherein migrating the network services comprises restoring the plurality of queued connections for the first socket to a second socket on the second computing system, and restoring the snapshot of the network services to the second computing system; and upon restoring the snapshot of the network services to the second computing system, restarting the network services on the second computing system, wherein restarting the network services comprises:

sending the cached first socket state, first protocol control block state, and first plurality of data packets to the first network service operating on the second computing system and sending the cached second socket state, second protocol control block state, and second plurality of data packets to the second network service operating on the second computing system; and upon sending the cached first socket state, first protocol control block state, and first plurality of data packets to the first network service and the cached second socket state, second protocol control block state, and second plurality of data packets to the second network service, sending received packets to the network services as they are received.

16. The system of claim 15, wherein generating a second computing system comprises creating, from a first logical partition storing the first system kernel, a second logical partition based on data stored on the first logical partition.

17. The system of claim 15, wherein generating a second computing system comprises creating, from a first virtual machine executing the first system kernel, a second virtual machine with identical data as the first virtual machine.

18. The system of claim 15, wherein the network services comprise one or more services that communicate with the client devices using User Datagram Protocol (UDP).

19. The system of claim 15, wherein the caching comprises storing received data packets in a plurality of data structures, and wherein the data packets are stored in one of the plurality of data structures based on a network service for which the received data packet was destined.

20. The system of claim 15, wherein the caching comprises storing received data packets in a cache local to a network interface on the first computing system.

* * * * *